Figure 1:
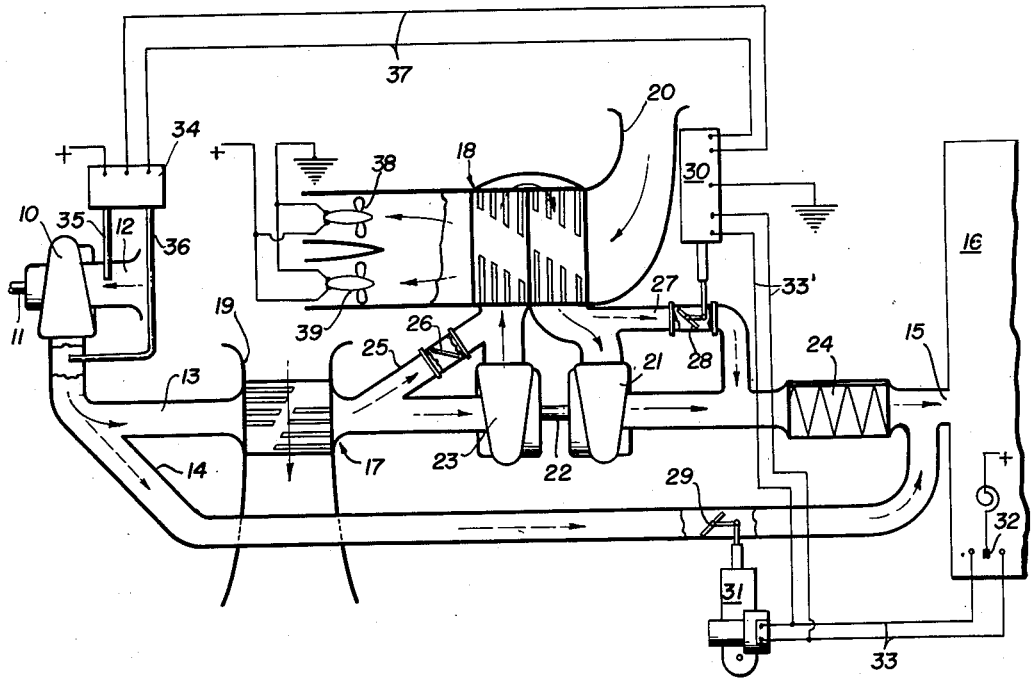

Dec. 23, 1952 — P. C. SCOFIELD ET AL — 2,622,406
AIR CONDITIONING SYSTEM FOR ENCLOSURES
Filed Sept. 2, 1950

Paul C. Scofield
Homer J. Wood
INVENTORS,

BY
ATTORNEY

Patented Dec. 23, 1952

2,622,406

UNITED STATES PATENT OFFICE 2,622,406

AIR CONDITIONING SYSTEM FOR ENCLOSURES

Paul C. Scofield, Glendale, and Homer J. Wood, Sherman Oaks, Calif., assignors to The Garrett Corporation, Los Angeles, Calif., a corporation of California Application September 2, 1950, Serial No. 182,904

12 Claims. (Cl. 62—6)

The present invention relates generally to an air conditioning system for conditioning air for an enclosure; and is more particularly concerned with a system which is especially useful for conditioning pressurized enclosures of an aircraft, such as the aircraft cabin.

Considering air conditioning systems as generally applied to aircraft enclosures, combinations of pressurization and refrigeration have in the main proved impractical at low altitudes because of compressor load limitations. It has therefore been generally necessary, in air-cycle systems for commercial aircraft to provide a pressure ratio limiter to protect the primary compressor of the system from overload because of transient demands. For example, in short-haul operations, transient conditions such as "hot cabin climb" or "pulling down" a hot cabin on the ground present very important considerations in the design of an air conditioning system which will provide a comfortable cabin under varied flight conditions, and provide quick conditioning when the aircraft is on the ground. According to the general concepts of the present invention full cognizance is given to these transient conditions and it seeks to overcome the attending problems in connection with the transient conditions as well as problems relating to equilibrium conditions in order to obtain over-all flight comfort.

With the foregoing in mind, it is one object of the herein described invention to provide an improved combined air pressurizing and air conditioning system which will make full use of all heat exchanger capacity and take advantage of maximum ram cooling during "hot cabin climb" and low altitude pressurization conditions.

A further object is to provide an air conditioning system wherein the air conditioning or refrigerating cycle may be modulated to meet varying cabin refrigeration demands by controlling flow through a by-pass around the entire air conditioning or refrigeration unit, the by-pass air and refrigerated or cooled air then being mixed and delivered to the aircraft enclosure or cabin.

A still further object is to provide improved modulating means in an air conditioning or refrigeration system utilizing a primary compressor, a secondary compressor driven by an expansion or cooling turbine, wherein controlled by-passes around the turbine and secondary compressor are arranged for operation depending upon the pressure ratio across the primary compressor so as to protect the primary compressor from overload conditions while providing a maximum of refrigeration capacity from the available equipment.

Still another object is to provide in an air conditioning system improved means for additionally cooling the compressed cabin air delivered from a heat exchanger to the cabin when the airplane is on the ground, by utilization of cabin exhaust air as a coolant for an aftercooler positioned in the cabin air flow path between the heat exchanger and the cabin.

Further objects of the invention will be brought out in the following part of the specification wherein detailed description is for the purpose of fully disclosing the invention without placing limitations thereon.

Figure 2:
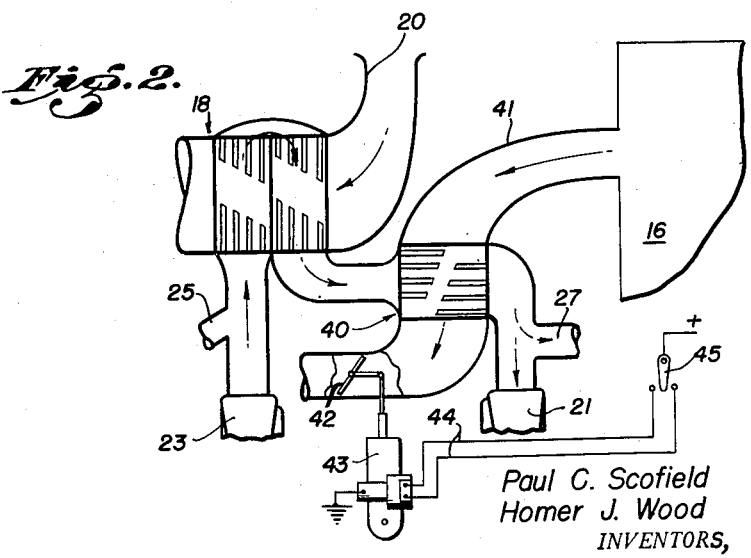

Referring to the accompanying drawings, which are for illustrative purposes only:

Fig. 1 is a view schematically representing an air conditioning system embodying the features of the present invention; and Fig. 2 is a fragmentary view of a portion of the system illustrated in Fig. 1, showing a modification thereof.

Referring now to the drawings, the air conditioning or refrigerating system according to the present invention utilizes a conditioning or cooling medium such as air which is supplied under pressure from a suitable source. The source in this instance has been illustrated as comprising a supercharger or compressor 10 which may be driven from suitable power means through a connecting shaft 11. Such power means may be the main engines of the aircraft upon which the air conditioning system is installed or the power source may comprise independently operable power means.

The intake of the compressor 10 receives air from a ram-duct 12 which will act, during flight, to supply air to the compressor under pressure.

The outlet of the compressor leads to divided duct systems 13 and 14 which are subsequently joined to a common inlet 15 to an enclosure 16 to which pressurizing and conditioning air is to be supplied. This enclosure is illustrated as comprising in the present instance an aircraft cabin. The duct 13 leads through the air conditioning or refrigerating mechanism of the system, while duct 14 provides a by-pass connection around the air conditioning or refrigerating mechanism and is arranged for modulating control as will hereinafter be explained in detail.

Air under pressure is conducted from the compressor 10, as shown in Fig. 1, through a primary heat exchanger 17 and a secondary heat exchanger 18, which are illustrated as respectively being of single pass and double pass construction. By means of these heat exchangers, the compressed air for the enclosure is cooled in two successive stages of cooling.

A suitable coolant medium is supplied to each of the heat exchangers, and is illustrated as comprising ambient air which is supplied through ram-ducts 19 and 20 respectively.

The cooled air from the secondary heat exchanger 18 is conducted through energy converting means 21, which in this instance consists of an expansion turbine, by which energy of the conditioning air is converted into mechanical energy and the conditioning air is further cooled by expansion prior to being delivered to the enclosure 16. This recovered power is delivered to a driving shaft 22 operatively connected with a secondary compressor 23 positioned in the flow path of conditioning air between the heat exchangers 17 and 18 for further compressing and augmenting the circulation of the conditioning air through the system.

The outlet from the energy converting means is conducted through a water separator 24 which is utilized to remove a portion of the entrained moisture which may be present in the turbine discharge air in order to provide better conditions in the enclosure 16, particularly where this enclosure is an aircraft cabin.

As shown in Fig. 1, the compressor 23 has a connection between its inlet and outlet sides which forms a by-pass 25 containing a normally closed check valve 26 which opposes flow through the by-pass under normal conditions.

The energy converting means 21 likewise has its inlet and outlet interconnected by a duct which forms a by-pass 27 therearound, flow through this by-pass being controlled by a valve 28 under conditions and for the purpose hereinafter to be explained. Flow through the duct 14 is controlled by means of a valve 29.

Modulation of the air conditioning or refrigeration cycle to meet varying cabin refrigeration demands is accomplished by the coordinated actuation of the by-pass valves 28 and 29 which are arranged for relative adjustment so as to vary the angular relationship and time of operation of the valves as desired. In some installations, it may be desired to utilize the valve 29 only for modulating the refrigeration cycle in accordance with cabin demands.

The valves 28 and 29 may be actuated by any suitable power device pneumatically, electrically or otherwise actuated and controlled. In the present instance, the valve 28 is shown as being operable by an electrically energized actuator 30, and the valve 29 by an electrically energized actuator 31, these actuators being controlled in response to variations in enclosure or cabin temperature by means of a thermostatic switch 32 arranged to selectively energize the conductors of a control circuit 33 and branch control circuit 33'.

In addition to modulating the refrigeration cycle in the manner explained above, means are provided for modifying this operation as a consequence of the occurrence of overload conditions on the primary compressor 10. Provision is made for overriding actuation of the valve 28, when the pressure ratio across the primary compressor 10 reaches a predetermined value. Provision may be made for pneumatically operating the valve 28 under said circumstances, but in the illustration shown in Fig. 1, there is schematically represented a control device 34 having tubular pressure connections 35 and 36 respectively with the inlet and outlet of the compressor 10. The device is arranged to electrically energize the actuator 30 over the electric circuit 37 so as to override the control through the thermostatic switch 32 and cause the valve 28 to open when the pressure ratio across the compressor 10 exceeds a predetermined amount.

The check valve 26 is so adjusted and designed that it will commence to open with respect to by-pass 25 at some time during the opening of valve 28. The primary compressor is thus protected against overload conditions, while providing a maximum of refrigeration capacity from the available equipment.

Provision is made for supplying coolant air to the secondary heat exchanger 18 during times of low-ram pressure such as during taxiing of the aircraft, or when the craft is on the ground. For such purpose, auxiliary air circulating means are provided, in the present instance, being electrically driven fans 38 and 39 which are positioned on the downstream side of the heat exchanger and act to induce flow of coolant therethrough.

Referring to Fig. 2, the system disclosed in Fig. 1 has been modified by deleting the primary heat exchanger 17 and installing an aftercooler 40 in the conditioning air flow path between the heat exchanger 18 and the energy converting means 21. This aftercooler is connected through a duct 41 to receive exhaust enclosure or cabin air as a coolant medium.

Flow of coolant through the aftercooler 40 is controlled by a valve 42 which is arranged to be opened manually or automatically when the aircraft is on the ground. In the present instance, the valve is illustrated as being operated by an actuator 43 having an energizing circuit 44 which is selectively energized by a switch 45. This switch may be manually operable or may be arranged to operate automatically in response to the operation of some other means, for example, lowering the landing wheels. It will be appreciated that although the valve 42 has here been shown on the downstream side of the aftercooler 40, it could be placed upstream and the coolant air supplied to the aftercooler as it is discharged through the cabin pressure regulators.

It will therefore be appreciated that, since the cabin or enclosure exhaust air is at a temperature substantially below ambient, further cooling of the air leaving the heat exchanger 18 will be effected. With this arrangement, there is no flow of cooling air through the aftercooler during flight, and it will therefore have little if any effect in reducing the temperature of the conditioning air leaving the heat exchanger 18.

We claim:

1. An air conditioning system, comprising: means for conducting air from a source of air under pressure to an enclosure; means for conditioning said air prior to delivery to said enclosure, including means for cooling said air and converting energy in said air into mechanical energy; a by-pass around said energy converting means only; a by-pass around said conditioning means; valves respectively positioned in said by-passes; means for controlling said valves in response to variations in a desired characteristic of said enclosure; and means for modifying the actuation of at least one of said valves upon the occurrence of a predetermined condition at said source.

2. An air conditioning system, comprising: means for conducting air from a source of air under pressure to an enclosure; means for conditioning said air prior to delivery to said enclosure, including means for cooling said air and converting energy in said air into mechanical energy; a by-pass around said energy converting means only; a by-pass around said conditioning means; valves respectively positioned in said by-passes; means for controlling said valves in response to enclosure temperature variations; and means for modifying flow through the energy converting means by-pass upon the occurrence of a predetermined condition at said source.

3. An air conditioning system, comprising: an air compressor; means for conducting air under pressure from said compressor to an enclosure; means for conditioning said air prior to delivery to said enclosure, including means for cooling said air and converting energy in said air into mechanical energy; a by-pass around said energy converting means only; a by-pass around said conditioning means; valves respectively positioned in said by-passes; means for controlling said valves in response to variations in a desired characteristic of said enclosure; and means for modifying flow through the energy converting means by-pass upon the occurrence of a predetermined pressure ratio across said compressor.

4. An air conditioning system including a source of compressed air for an aircraft enclosure and a heat exchanger for cooling said compressed air prior to delivery to said enclosure; an aftercooler downstream from said heat exchanger; a duct for conducting enclosure air through said aftercooler for coolant purposes; a valve in said duct in the coolant discharge; and valve actuating means operable to open said valve when the aircraft is on the ground, and close said valve when the aircraft is in flight.

5. In an air conditioning system including a source of compressed air for an aircraft enclosure and a heat exchanger for cooling said compressed air prior to delivery to said enclosure; an aftercooler downstream from said heat exchanger utilizing exhaust enclosure air as a coolant; and means controlling flow of said coolant so as to enable coolant flow only when the aircraft is on the ground.

6. An air conditioning system, comprising: air compressing means including a first compressor; means forming an air flow path from said compressor to an enclosure; heat exchanger means for cooling the air in said path by first and second stages; means for further cooling the air after passage through said second stage by converting energy therein into mechanical energy; a second compressor between said first and second stages driven by said energy converting means; and means operable to by-pass said air around said second compressor and said energy converting means upon the occurrence of a predetermined load limit on said first compressor.

7. An air conditioning system, comprising: air compressing means including a first compressor; means forming an air flow path from said compressor to an enclosure; heat exchanger means for cooling the air in said path by first and second stages; means for further cooling of the air after passage through said second stage by converting energy therein into mechanical energy; a second compressor between said first and second stages driven by said energy converting means; by-passes respectively around said second compressor and said energy converting means; valve means for the by-pass around said energy converting means operable to open position upon the occurrence of a predetermined load on said first compressor; and a normally closed check valve in the by-pass of said second compressor activated to open position upon opening of said valve means.

8. An air conditioning system, comprising: air compressing means including a first compressor; means forming an air flow path from said compressor to an enclosure; heat exchanger means for cooling the air in said path by first and second stages; means for further cooling of the air after passage through said second stage by converting energy therein into mechanical energy; a second compressor between said first and second stages driven by said energy converting means; by-passes respectively around said second compressor and said energy converting means; and valves in said by-passes operative in response to the occurrence of a predetermined pressure ratio across said first compressor.

9. An air conditioning system, comprising: air compressing means; means for conducting air under pressure from said compressing means to an enclosure; means for cooling said air prior to delivery to said enclosure, including means for further cooling of said air by converting energy therein into mechanical energy; a by-pass around said energy converting means; and means responsive to load conditions of said compressing means for controlling said by-pass.

10. An air condiitoning system, comprising: air compressing means; means for conducting air under pressure from said compressing means to an enclosure; means for cooling said air prior to delivery to said enclosure, including means for further cooling of said air by converting energy therein into mechanical energy; a by-pass around said energy converting means; and valve means for controlling flow in said by-pass depending upon pressure ratio across said air compressing means.

11. An air conditioning system, comprising: air compressing means; means for conducting air under pressure from said compressing means to an enclosure; means for cooling said air prior to delivery to said enclosure, including means for further cooling of said air by converting energy therein into mechanical energy; a by-pass around said energy converting means; and means for controlling said by-pass in accordance with the ratio of inlet-outlet pressures of said air compressing means.

12. An air conditioning system, comprising: means for conducting air from a source of air under pressure to an aircraft enclosure; a heat exchanger for cooling said air prior to delivery to said enclosure; a ram-duct for supplying coolant air to said heat exchanger under flight conditions; auxiliary air moving means for circulating coolant air to said heat exchanger under low-ram conditions; and means for further cooling of said pressure air, under non-flight conditions, by heat exchange with exhaust enclosure air.

PAUL C. SCOFIELD.
HOMER J. WOOD.

REFERENCES CITED

The following references are of record in the file of this patent:

UNITED STATES PATENTS

| Number | Name | Date |
| --- | --- | --- |
| 515,585 | Hill | Feb. 27, 1894 |
| 2,479,991 | Wood | Aug. 23, 1949 |
| 2,484,850 | Paget | Oct. 18, 1949 |
| 2,509,899 | Wood | May 30, 1950 |